United States Patent [19]

Wada

[11] Patent Number: 5,067,115
[45] Date of Patent: Nov. 19, 1991

[54] ULTRASONIC OBSTACLE SENSOR

[75] Inventor: Shunichi Wada, Himeji, Japan

[73] Assignee: Mitsubishi Denki K.K., Tokyo, Japan

[21] Appl. No.: 608,787

[22] Filed: Nov. 5, 1990

[30] Foreign Application Priority Data

Nov. 6, 1989 [JP] Japan .................... 1-287347

[51] Int. Cl.$^5$ ............................ G01S 15/00
[52] U.S. Cl. ......................... 367/99; 367/98
[58] Field of Search ................. 367/99, 97, 98

[56] References Cited

U.S. PATENT DOCUMENTS

| 4,912,967 | 4/1990 | Shiraishi et al. | 73/105 |
| 4,975,889 | 12/1990 | Petrucelli et al. | 367/98 |
| 4,991,146 | 2/1991 | Ransdell et al. | 367/98 |

OTHER PUBLICATIONS

Obstacle Avoidance with Ultrasonic Sensors, IEEE Journal, vol. 4, No. 2, Apr. 1988.
Application Technology of Cooperative Laser Radar System for Automobiles on Expressways, IEEE Tokyo, No. 26, 1987.

*Primary Examiner*—Daniel T. Pihulic
*Attorney, Agent, or Firm*—Sughrue, Mion, Zinn, Macpeak & Seas

[57] ABSTRACT

An ultrasonic obstacle sensor for sensing an obstacle on a road surface is disclosed which projects ultrasonic waves in the form of pulses toward the forwardly distant surface of a road in a downwardly inclined forward direction, and which is able to discriminate an obstacle on the road surface through reflection waves therefrom in a most effective and reliable manner. To this end, a timing instructor intermittently generates an instruction signal, based on which ultrasonic waves are generated. An ultrasonic transmitter projects the ultrasonic waves thus generated toward a road surface, and the reflected waves therefrom are received by an ultrasonic receier which in turn generates a reception signal. A reception signal processor AM detects the reception signal to provide an AM modulation signal. A time calculator calculates a time elapsing from the generation of the instruction signal. A discrimination signal generator generates a discrimination signal having an intensity which increases before the lapse of a predetermined time from the time of generation of the instruction signal, and decreases thereafter. A comparison circuit makes a comparison between the AM modulation signal and the discrimination signal to generate an output signal representative of the presence or absence of an obstacle on the road surface.

6 Claims, 6 Drawing Sheets

ULTRASONIC OBSTACLE SENSOR

FIELD OF THE INVENTION

The present invention relates to an ultrasonic obstacle sensor for sensing an obstacle by use of ultrasonic waves, and more specifically, to such an ultrasonic sensor which is particularly suitable for use with a vehicular suspension control apparatus for sensing the condition of a road ahead of the vehicle on which the vehicle is travelling, in order to alleviate shocks which could be caused to the vehicle by obstacles on the road surface.

BACKGROUND OF THE INVENTION

Japanese Patent Publication (Kokoku) No. 1-30436 discloses an example of such a conventional ultrasonic sensor which senses obstacles around a vehicle using ultrasonic waves.

Japanese Patent Laid-Open (Kokai) No. 62-131813 discloses another example which senses the condition of a road ahead of a vehicle for the purpose of alleviating shocks caused to the body of the vehicle by road surface irregularities.

Conventionally, for the purpose of sensing an object such as an obstacle around a travelling vehicle by use of ultrasonic waves, it is common practice to calculate the distance between the vehicle and the object using ultrasonic waves, and to this end, various proposals have been made for accurately measuring the distance from a vehicle to an object which lies within a few centimeters or few meters away from the vehicle. In this practice, however, an ultrasonic sensor senses, in addition to reflecting waves from the object, those from a predetermined forward surface of a road, and to avoid this, it is a general trend to direct a horn to an appropriate orientation so as not to pick up undesirable waves reflected from the road surface. Thus, in this case, no feasible approach on signal processing has generally been made for positively sensing only the ultrasonic waves reflected from the road surface so as to detect obstacles thereon in an effective manner.

On the other hand, another proposal has been made in which continuous ultrasonic waves are projected toward the surface of a road ahead of a vehicle, and reflected waves therefrom are continuously monitored so as to detect obstacles on the road surface. In this case, however, there are many drawbacks as listed below.

1) Overheating of a wave emitter precludes the energy of ultrasonic waves emitted therefrom from being enhanced to a practical level.

2) Interference between the projected waves and the reflected waves takes place, and development of standing waves provides adverse effects.

3) It is impossible to discern between reflected waves from the road surface and reflected waves from other places or objects.

4) There is no effective measure for removing the influences of factors other than road surface irregularities such as, for example, winds, temperature variations, etc., which can change the intensity of reflected waves.

Accordingly, the above-mentioned conventional ultrasonic obstacle sensors have various problems as referred to above, and are not satisfactory and feasible for practical applications.

SUMMARY OF THE INVENTION

The present invention is intended to obviate the above-described problems of the prior art ultrasonic obstacle sensors. An object of the present invention is to provide a novel and improved ultrasonic obstacle sensor which projects ultrasonic waves in the form of pulses toward the forwardly distant surface of a road in a downwardly inclined forward direction, and which is able to discriminate obstacles on the road surface through reflected waves therefrom in a most precise, effective and reliable manner. In order to achieve the above object, according to the present invention, there is provided an ultrasonic obstacle sensor comprising:

timing instruction means for generating an instruction signal for intermittently providing ultrasonic waves;

an ultrasonic wave generator for generating ultrasonic waves based on the instruction signal from the timing instruction means;

an ultrasonic transmitter for transmitting the ultrasonic waves toward a road surface;

an ultrasonic receiver for receiving the ultrasonic waves reflected from the road surface to generate a reception signal;

reception signal processing means for AM demodulating the reception signal to provide an AM demodulation signal;

time calculation means for calculating a time elapsing from the time of generation of the instruction signal;

a discrimination signal generator for generating a discrimination signal having an intensity which increases before the lapse of a predetermined time from the time of generation of the instruction signal, and decreases thereafter; and a comparison circuit for making a comparison between the AM demodulation signal and the discrimination signal to generate an output signal representative of the presence or absence of an obstacle on the road surface.

The above and other objects, features and advantages of the present invention will become apparent from the detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

Figure 1:
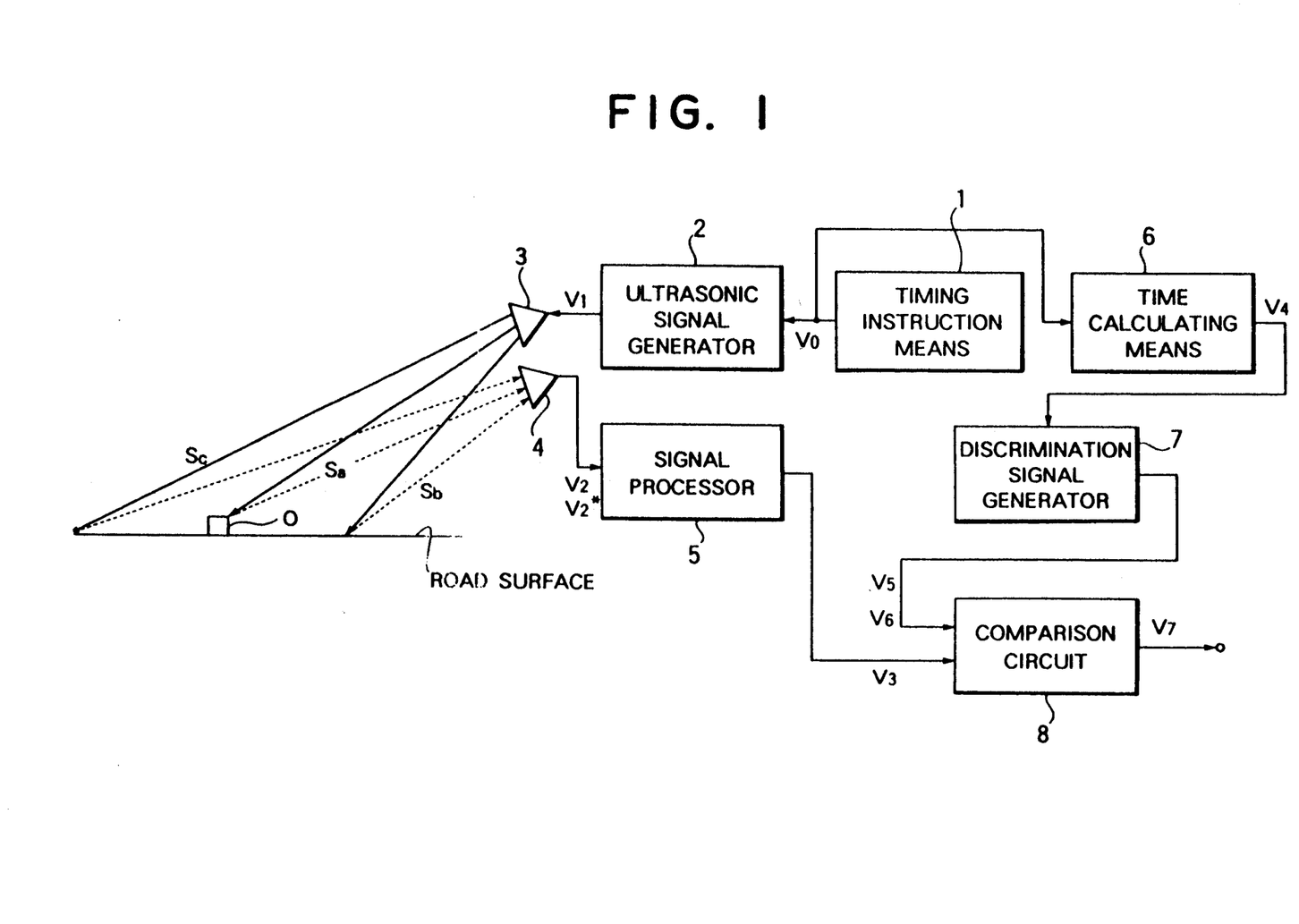
FIG. 1 is a block diagram of the general arrangement of an embodiment of an ultrasonic obstacle sensor according to the present invention.

Referring to the drawings and first to FIG. 1, there is diagrammatically shown the general arrangement of an ultrasonic obstacle sensor constructed in accordance with the principles of the present invention. In FIG. 1, the ultrasonic obstacle sensor illustrated includes a timing instruction means 1, an ultrasonic signal generator 2 connected to the timing instruction means 1, an ultrasonic wave transmitter 3 disposed near the front bumper of a vehicle and connected to the ultrasonic signal generator 2, an ultrasonic wave receiver 4 in the form of an ultrasonic microphone installed near the front bumper, a signal processor 5 connected to the ultrasonic transmitter 4, a time calculating means 6 connected to the timing instruction means 1, a discrimination signal generator 7 connected to the time calculating means 6, and a comparison circuit 8 connected to the signal processor 5 and the discrimination signal generator 7.

Figure 2:
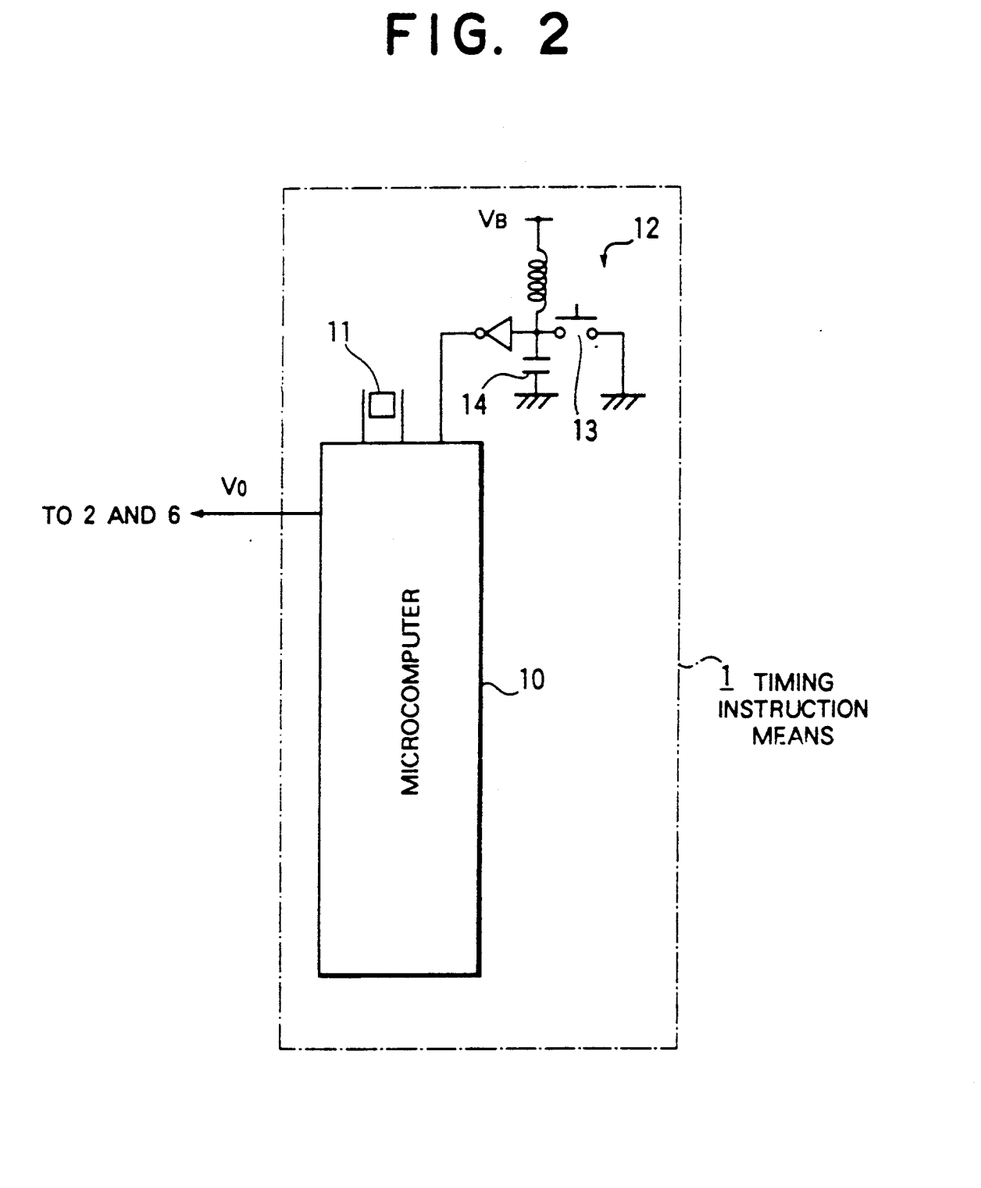
FIG. 2 is a circuit diagram of a timing instruction means of the embodiment of FIG. 1.

As shown in FIG. 2, the timing instruction means 1 comprises a microcomputer 10 such as, for example, a Hitachi model HD63B01Y manufactured by Hitachi Co., Ltd., a quartz oscillator 11 connected to the microcomputer 10, and an energization circuit 12 connected to the microcomputer 10. The energization circuit 12 includes a self-return type normally closed energization switch 13 installed on an instrument panel in a driver's compartment of the vehicle, and a waveform shaping circuit 14 connected to the energization switch 13.

Figure 3:
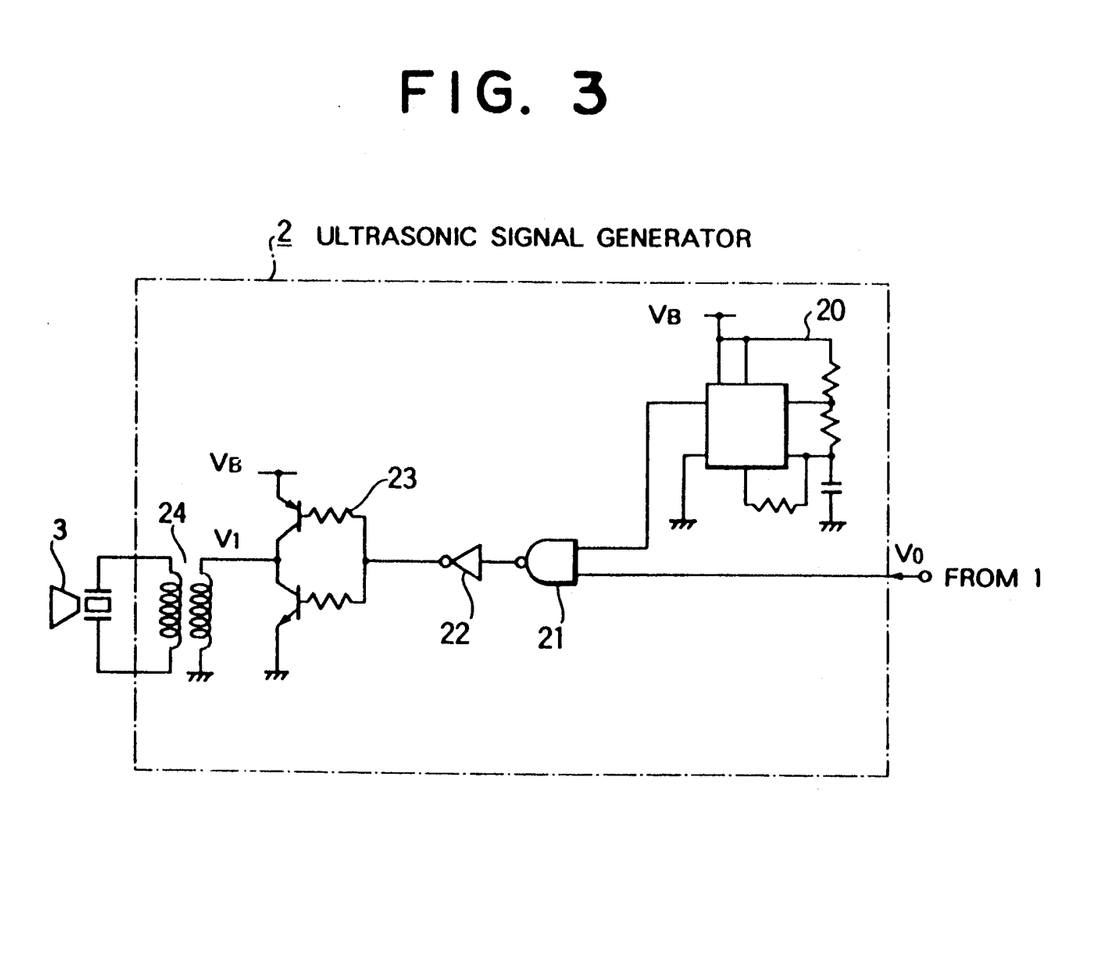
FIG. 3 is a circuit diagram of an ultrasonic signal generator of the embodiment of FIG. 1.

As clearly shown in FIG. 3, the ultrasonic signal generator 2 comprises an ultrasonic oscillator 20, a NAND gate 21 connected to the ultrasonic oscillator 20 and the microcomputer 10 of the timing instruction means 1, an inverter 22 connected to the NAND gate 21, an amplifier circuit 23 connected to the inverter 22, and a voltage increasing transformer 24 connected to the amplifier circuit 23.

Figure 4:
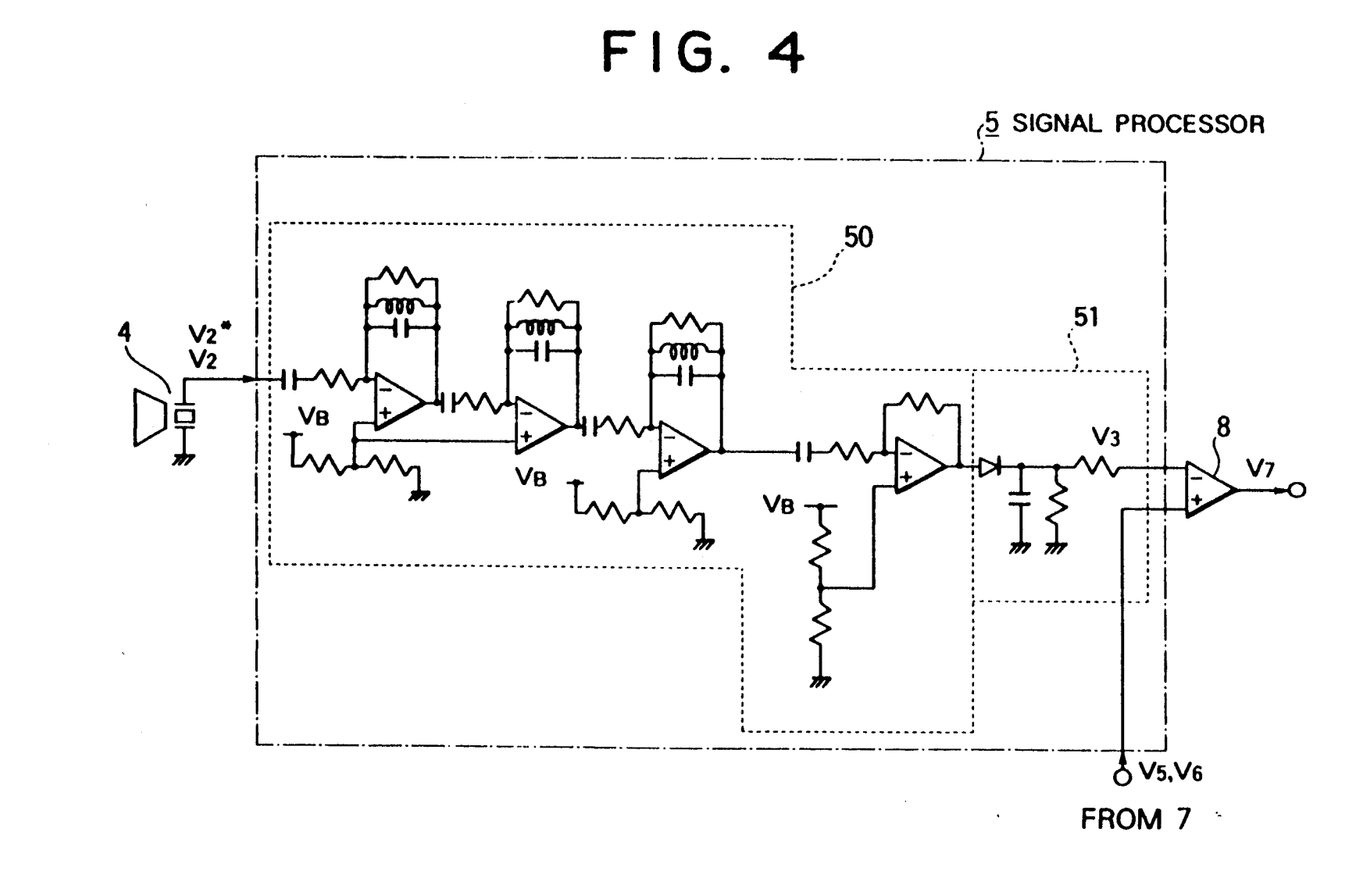
FIG. 4 is a circuit diagram of a signal processing means of the embodiment of FIG. 1.

As illustrated in FIG. 4, the signal processor 5 comprises an amplifier circuit 50 connected to the ultrasonic receiver 4, and an AM demodulation circuit 51 connected to the amplifier circuit 50.

Figure 5:
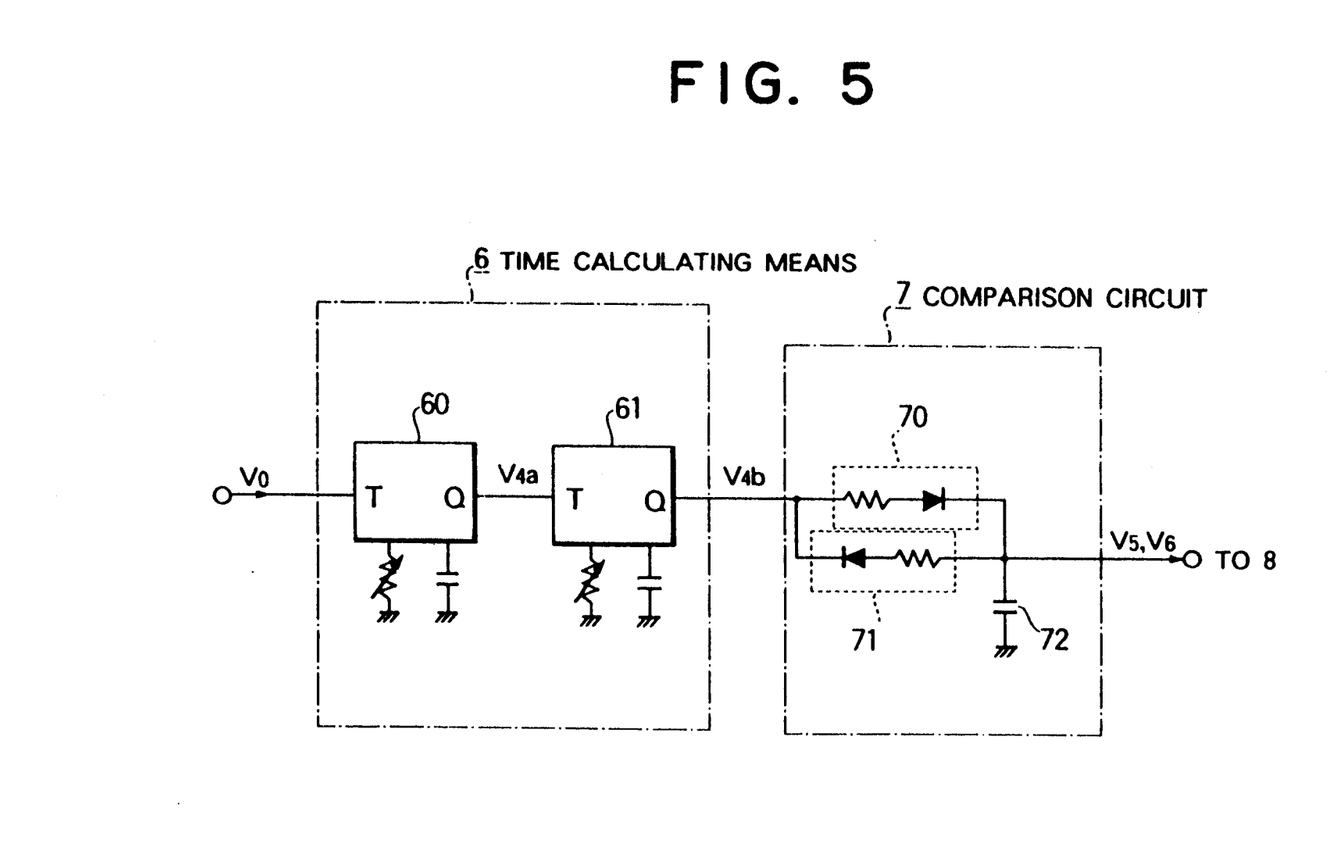
FIG. 5 is a circuit diagram of a time calculating means and a discrimination signal generator of the embodiment of FIG. 1.

As shown in FIG. 5, the time calculation means 6 comprises a monostable multipulse generator circuit 60 connected to the microcomputer 10 of the timing instruction means 1, and a monostable multipulse generator circuit 61 connected to the monostable multipulse generator circuit 60.

The discrimination signal generator 7 comprises a charging circuit 70 connected to the monostable multipulse generator circuit 61, a discharge circuit 71 connected in parallel to the charging circuit 70, and a capacitor 72 connected to the charging circuit 70 and the discharge circuit 71.

Figure 6:
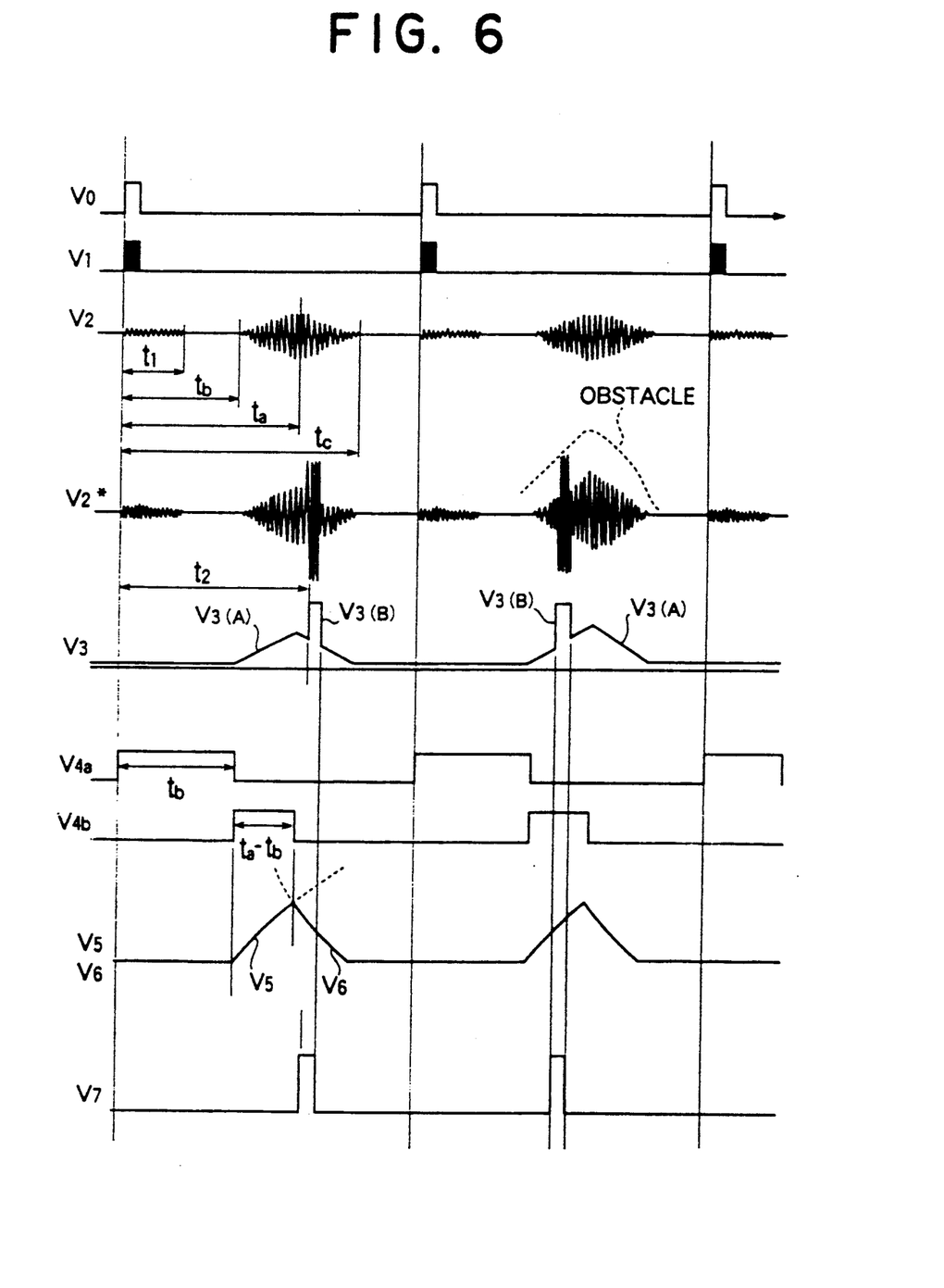
FIG. 6 is a timing chart showing signal waveforms at various portions of the embodiment of FIG. 1.

The operation of the above embodiment will now be described in detail with reference to the timing chart of FIG. 6. In FIG. 6, $V_0$ represents an instruction signal, $V_1$ a drive signal, $V_2$ a reception signal which is the reflected waves from a road surface without large obstacles, $V_2^*$ a reception signal which is the reflected waves from a road surface with an obstacle, $V_3$ an AM demodulation signal, $V_{4a}$ and $V_{4b}$ timing pulse signals, $V_5$ and $V_6$ discrimination signal, and $V_7$ a detection signal. A portion of the reception signal $V_2$ during a period $t_1$ is due to direct or non-reflected waves or deflected waves and is unnecessary for the purpose of the invention. A portion of the reception signal $V_2$ during the time $t_b$ corresponds to a round trip time along a minimum detection path $S_b$ in FIG. 1, if the ultrasonic signal transmitter and receiver are closely arranged with respect to each other with substantially the same directionality.

Similarly, a portion of the reception signal $V_2$ during the time $t_a$ corresponds to a round trip time along a middle path $S_a$ in FIG. 1, and a portion of the reception signal $V_2$ during the time $t_0$ corresponds to a round trip time along a maximum path $S_c$ in FIG. 1. These times $t_a$, $t_b$, and $t_c$ are expressed as follows:

$t_a = 2S_a/C$,
$t_b = 2S_b/C$,
$t_c = 2S_c/C$ where C is the speed of sound waves.

The timing instruction means 1 feeds an instruction signal $V_0$, as illustrated in FIG. 6, to the ultrasonic signal generator 2 which, based on the instruction signal $V_0$, generates a pulse of ultrasonic waves with a predetermined pulse width for every predetermined time interval. The timing instruction means 1 may be constituted by a programmable timer built into the microcomputer 10, or by a commercially available timer IC. The energization switch 13 of the timing instruction means 1 generates a low-level signal upon temporal closure thereof. The waveform shaping circuit 14 shapes the low-level signal in such a manner as to reverse its waveform, generating an energization signal. The microcomputer 10 receives, in response to the supply of power thereto from a DC power source, a constant voltage from a constant voltage circuit and starts to operate. Thus, based on the oscillation of the crystal oscillator 11, the microcomputer 10 generates a series of clock signals and executes, in response to each of the clock signals, a computer program stored therein and outputs an instruction signal $V_0$.

The ultrasonic signal generator 2 drives, based on the instruction signal $V_0$, the ultrasonic transmitter 3 during a predetermined length of time through the action of a drive signal $V_1$ which has a predetermined voltage and a predetermined frequency. During the generation of the instruction signal $V_0$ by the microcomputer 10, the ultrasonic signal generator 2 supplies via the NAND gate 21 to the inverter 22 a series of ultrasonic oscillation pulses having a predetermined frequency which are generated by the ultrasonic wave oscillation circuit 20. The inverter 22 successively generates ultrasonic pulses which are then amplified by the amplifier circuit 23 to provide a series of oscillation pulses. The voltage of the oscillation pulses are raised by the voltage-increasing transformer and fed to the ultrasonic transmitter 3.

The ultrasonic transmitter 3 projects ultrasonic pulses toward a road surface ahead of the vehicle in a forwardly and downwardly inclined direction, and a portion of the ultrasonic pulses $V_2$ (or $V_2^*$) reflected from the road surface is received by the ultrasonic receiver 4.

Due to the directionalities of the ultrasonic transmitter 3 and the ultrasonic receiver 4, the intensity of the ultrasonic pulse waves reflected from the road surface begins to increase from time $t_b$, reaches a peak value at time $t_a$ and then decreases toward time $t_c$ at which it disappears. The key factors for determining the change in the intensity of the ultrasonic pulse waves during the time interval between $t_b$ and $t_c$ are the directionalities and geometrical layout of the ultrasonic transmitter and receiver 3, 4. The intensity of the ultrasonic pulse waves generally changes in a triangular shape with a peak value being taken at time $t_a$.

The reception signal $V_2^*$ in FIG. 6 shows the waveform of ultrasonic pulse waves reflected from a road surface with an obstacle 0. This signal $V_2^*$ has a waveform which is a combination of a first component in the form of a generally triangular shape, which is due to a road surface without any obstacle, and a second component due to the obstacle 0 superposed on the first component. The time duration $t_2$ corresponds to a round trip time along the minimum path from the ultrasonic transmitter 3 to the ultrasonic receiver 4 through the obstacle 0.

Let us consider that the obstacle 0 remains standing still on the road surface and a vehicle having an ultrasonic obstacle sensor mounted thereon is running on the road toward and past the obstacle 0. In this case, the sensor begins to detect the obstacle 0 at time $t_c$ and stops detecting it at time $t_b$ which is after time $t_a$, and thereafter the vehicle rides over and passes the obstacle 0. During this process, time $t_2$ passes from $t_c$ to $t_b$ through $t_a$.

The peak value of the reflected waves corresponding to the obstacle 0 corresponds to the intensity of the waves reflected from the road surface at time $t_2$ multiplied by a predetermined multiplication rate, so that tracing the peak of the reflected waves due to the obstacle 0 over time $t_2$ provides a substantially triangular shape as in the case of the change in the intensity of the waves reflected from a road surface without any obstacle.

The reception signal processing means 5 amplifies the reception signal $V_2$ ($V_2^*$) so as to facilitate the processing of the signal reception level, and performs AM demodulation, generating an output in the form of an AM demodulation signal $V_3$. If the road surface is flat, the AM demodulation signal $V_3$ is composed of a reception signal component $V_{3(A)}$ due to the flat surface alone. On the other hand, if the obstacle 0 exists on the road surface, the component of the reception signal waves $V_{3(B)}$ due to the obstacle 0 is superposed on the reception wave component $V_{3(A)}$ to provide the following AM demodulation signal $V_3$:

$$V_3 = V_{3(A)} + V_{3(B)}$$

The reception signal processing means 5 mask the portion of the reception signal $V_2$ ($V_2^*$) which lies during time $t_2$ while performing AM demodulation, so that only the necessary portion thereof between tb and tc is subject to AM demodulation to provide an AM demodulation signal $V_3$.

On the other hand, the time calculation means 6 is triggered by the instruction signal $V_0$ to calculate a time interval corresponding to a length of time between $t_b$ and $t_c$ by the time when the next cycle starts, or it generates timing pulses $V_{4a}$ and $V_{4b}$, as shown in FIG. 6, which in turn actuates the discrimination signal generator means 7.

The time calculation means 6 may be constituted by a programmable timer like that built into the microcomputer 10 so as to provide an instruction signal similar to the instruction signal $V_0$, or it may be constituted by a monostable multivibrator circuit comprising a timer IC which is triggered by the instruction signal $V_0$ to output a pulse signal having a predetermined width. The timing pulse signals $V_{4a}$ and $V_{4b}$ thus obtained have time widths corresponding to the time durations $t_b$ and $t_a - t_b$, respectively.

The discrimination signal generator 7 generates, in response to a change from the low to high level of the timing pulse signal $V_{4b}$, a discrimination signal (i.e., charging voltage signal) $V_5$ which simply increases until the lapse of a predetermined time which is determined by the charging circuit 70 and the capacitor 72. The discrimination signal $V_5$ reaches a peak value at time $t_a$, and upon a change from the high to low level of the timing pulse signal $V_{4b}$, the discrimination signal generator 7 generates another discrimination signal (i.e., a discharging voltage signal) $V_6$ having a discharging waveform which reaches a minimum value at time $t_c$ which is determined by the discharge circuit 71 and the capacitor 72.

The comparison circuit 8 makes a comparison between the AM demodulation signal $V_3$ from the reception signal processing means 5 and the discrimination signals $V_5$ and $V_6$ from the discrimination signal generator 7, and as a result, generates an output detection signal $V_7$.

In the above-described embodiment, as can be seen from the foregoing description, it is possible to detect the presence or absence of an obstacle on the surface of a road in a most precise, quick and effective manner without being subject to any adverse influences from periodical changes in the voltage level of ultrasonic waves reflected from the road surface. In other words, an obstacle can be effectively discriminated from the road surface by using the reception waves having a discrimination level or waveform in the form of a triangular shape which is a function of the travel time (i.e., the round trip time) of the waves from the transmitter to the receiver.

Although in the above embodiment, the timing instruction means 1 comprises a microcomputer 10 and the time calculation means 6 and the discrimination signal generator 7 are respectively formed of separate electric circuits, all of these elements can be constituted by a microcomputer while providing substantially the same effects.

Further, in the above embodiment, the discrimination signal generator 7 comprises a charging circuit 70 using an analog CR and a discharge circuit 71 and generates a discrimination signal (comparison voltage) having a triangular-shaped waveform which gradually increases toward a peak and then gradually decreases. In this respect, however, to achieve the intended purpose, the discrimination signal generator 7 may also comprise a digital circuit or a microcomputer which generates a discrimination signal having a stepwise waveform which increases and decreases in a stepwise fashion. Moreover, though in the above embodiment, the discrimination signal generator 7 comprises two electronic circuits, it may be constructed otherwise, for example, of a single circuit which can generate different predetermined discrimination signals before and after the lapse of a predetermined time.

In addition, the ultrasonic transmitter 3 and the ultrasonic receiver 4 are constructed separately from each other the above embodiment, but they may, of course, be a single ultrasonic microphone which is used by time-sharing.

What is claimed is:

1. An ultrasonic obstacle sensor comprising:
   timing instruction means for generating an instruction signal for intermittently providing ultrasonic waves;
   an ultrasonic wave generator for generating ultrasonic waves based on the instruction signal from said timing instruction means;
   an ultrasonic transmitter for transmitting the ultrasonic waves toward a road surface;

an ultrasonic receiver for receiving the ultrasonic waves reflected from the road surface to generate a reception signal;

reception signal processing means for AM demodulating the reception signal to provide an AM demodulation signal;

time calculation means for calculating a time elapsing from the time of generation of the instruction signal;

a discrimination signal generator for generating a discrimination signal having an intensity which increases before a lapse of a predetermined time from the time of generation of the instruction signal, and decreases thereafter; and a comparison circuit for making a comparison between the AM demodulation signal and the discrimination signal to generate an output signal representative of the presence or absence of an obstacle on the road surface.

2. An ultrasonic obstacle sensor as claimed in claim 1, wherein said timing instruction means comprises a microcomputer, a crystal oscillator connected to said microcomputer for generating a series of clock pulses, and an energization circuit connected to said microcomputer, said energization circuit including a self-return type normally closed energization switch and a waveform shaping circuit connected to the energization switch.

3. An ultrasonic obstacle sensor as claimed in claim 1, wherein said ultrasonic wave generator comprises an ultrasonic oscillator, a NAND gate connected to said ultrasonic oscillator and said timing instruction means, an inverter connected to said NAND gate, an amplifier circuit connected to said inverter, and a voltage increasing transformer connected to the amplifier circuit.

4. An ultrasonic obstacle sensor as claimed in claim 1, wherein said time calculation means comprises a first monostable multipulse generator circuit connected to said timing instruction means, and a second monostable multipulse generator circuit connected to the first monostable multipulse generator circuit.

5. An ultrasonic obstacle sensor as claimed in claim 1, wherein said reception signal processing means comprises an amplifier circuit connected to said ultrasonic receiver, and an AM demodulation circuit connected to said amplifier circuit.

6. An ultrasonic obstacle sensor as claimed in claim 4, wherein said discrimination signal generator comprises a charging circuit connected to said monostable multipulse generator circuit, a discharge circuit connected in parallel to said charging circuit, and a capacitor connected to said charging circuit and said discharge circuit.

* * * * *